United States Patent
Itkin et al.

(10) Patent No.: US 10,127,053 B2
(45) Date of Patent: Nov. 13, 2018

(54) HARDWARE DEVICE SAFE MODE

(71) Applicant: Mellanox Technologies, Ltd., Yokneam (IL)

(72) Inventors: Yuval Itkin, Zoran (IL); Ran Sofer, Herzliya (IL); Amir Ancel, Moran (IL); Ido Gross, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 153 days.

(21) Appl. No.: 15/391,886

(22) Filed: Dec. 28, 2016

(65) Prior Publication Data
US 2018/0181410 A1   Jun. 28, 2018

(51) Int. Cl.
G06F 9/44       (2018.01)
G06F 9/4401    (2018.01)
G06F 13/42     (2006.01)
G06F 1/24      (2006.01)

(52) U.S. Cl.
CPC .............. *G06F 9/4411* (2013.01); *G06F 1/24* (2013.01); *G06F 13/4282* (2013.01); *G06F 2213/0026* (2013.01)

(58) Field of Classification Search
CPC ............. G06F 11/0757; G06F 11/0754; G06F 11/0793; G06F 11/076; G06F 11/1402; G06F 11/1417; G06F 11/142; G06F 11/1438; G06F 11/1441; G06F 1/24; G06F 2213/0026; G06F 9/4408; G06F 9/4411
See application file for complete search history.

(56) References Cited

U.S. PATENT DOCUMENTS

| | | | | |
|---|---|---|---|---|
| 5,652,832 A * | 7/1997 | Kane | .................. | G06F 11/142 714/2 |
| 5,787,246 A * | 7/1998 | Lichtman | .............. | G06F 15/177 709/220 |
| 6,272,626 B1 * | 8/2001 | Cobbett | .............. | G06F 11/1417 713/100 |
| 6,754,818 B1 * | 6/2004 | Lee | ...................... | G06F 9/4406 713/1 |
| 6,763,454 B2 * | 7/2004 | Wilson | .................. | G06F 9/4411 713/1 |
| 7,315,940 B1 * | 1/2008 | Audette | .............. | G06F 11/1417 713/1 |
| 2002/0152327 A1 | 10/2002 | Kagan et al. | | |

(Continued)

OTHER PUBLICATIONS

PCI Express® Base Specification, Revision 3.1 , 1073 pages, Mar. 2014.

(Continued)

*Primary Examiner* — Jaweed A Abbaszadeh
*Assistant Examiner* — Brian J Corcoran
(74) *Attorney, Agent, or Firm* — D. Kligler IP Services Ltd.

(57) ABSTRACT

A startup sequence in a computer system is initiated by detecting a bus reset event in an I/O device connected to a host, and responsively to the bus reset event communicating resources required to be allocated by the host. When a startup command from a host driver is not received within a predetermined bus reset count, the device autonomously changes its current configuration to a safe mode configuration, wherein fewer resources are required to be allocated relative to the current configuration. The safe mode configuration is communicated from the device to the host.

15 Claims, 3 Drawing Sheets

(56) References Cited

U.S. PATENT DOCUMENTS

| | | | |
|---|---|---|---|
| 2004/0054839 A1* | 3/2004 | Lee | G06F 9/4411 |
| | | | 710/306 |
| 2004/0221194 A1* | 11/2004 | Denninghoff | G06F 9/4406 |
| | | | 714/11 |
| 2007/0118717 A1* | 5/2007 | Sanada | G06F 12/0646 |
| | | | 711/173 |
| 2009/0119496 A1* | 5/2009 | Chen | G06F 9/4401 |
| | | | 713/1 |
| 2010/0306518 A1* | 12/2010 | Suryawanshi | G06F 1/24 |
| | | | 713/1 |
| 2012/0297099 A1* | 11/2012 | Kochar | G06F 13/102 |
| | | | 710/104 |
| 2015/0215343 A1 | 7/2015 | Itkin et al. | |
| 2016/0232057 A1 | 8/2016 | Star et al. | |

OTHER PUBLICATIONS

Infiniband Trade Association, "InfiniBandTM Architecture Specification vol. 1", Release 1.2.1, Nov. 2007.

* cited by examiner

HARDWARE DEVICE SAFE MODE

BACKGROUND OF THE INVENTION

1. Field of the Invention

This invention relates to arrangements and protocols for real-time communications of digital information. More particularly, this invention relates to remedial actions to ensure a safe condition of a digital device in the event of error.

2. Description of the Related Art

The meanings of certain acronyms and abbreviations used herein are given in Table 1.

TABLE 1

Acronyms and Abbreviations

| | |
|---|---|
| BAR | Base Address Register |
| BIOS | Basic Input/Output System |
| BMC | Baseboard Management Controller |
| HCA | Host Channel Adapter |
| IB | Infiniband |
| MCTP | Management Component Transport Protocol |
| NC-SI | Network Controller Sideband Interface |
| NIC | Network Interface Card |
| PCI | Peripheral Component Interconnect |
| PCIe | PCI Express |
| RMII | Reduced Media-Independent Interface |
| SMBus | System Management Bus |

The term "safe mode" refers to a mode of operation of an operating system for a computing device or for software in which the device or program or a hardware device in a computer system that operates with limited resources. Typically, safe mode is a diagnostic mode of operation that is initiated following detection of a failure of the device to boot, or following a detection of an error.

For example, in safe mode the well-known Windows® operating system for personal computers executes with a minimum number of system files. Instead of a vendor-specific display driver, a generic video graphics array (VGA) display driver provides only 16 basic colors and a very low resolution of 640×480 pixels. Most drivers for peripherals such as mice, keyboards, printers, and scanners are not loaded. Networking may be disabled, so that the machine lacks connectivity to the Internet and other computers in a local area network.

In a recent example, U.S. Patent Application Publication No. 2016/0232057 describes a storage device with a memory having an alternative safe mode boot loading process that can be activated when the storage device detects a malfunction. The safe mode operation allows for recovery and debugging by a host.

SUMMARY OF THE INVENTION

A device, such as a network interface card (NIC), switch or router, may be configured to require more resources than are available on the platform on which it is installed. In such a case, the system may fail to boot and will not be able to recover without physically removing the device from the system. Safe mode operation is not conventionally available in such devices. Thus, in an arrangement where large numbers of platforms are managed with devices, which may require more than the supported resources, a failure to boot of each of these platforms may require dispatch of a technician to physically remove misconfigured device(s) from each such system. The functionality of the system inevitably suffers for a time, even when a replacement device is conveniently available. Maintenance costs of physically accessing such systems and replacing a one or more misconfigured devices are high, and recovery time such systems can be very long. The problem is aggravated when the managed devices are geographically distributed and remotely managed.

According to embodiments of the invention, a device possesses a capability of detecting a misconfiguration during system startup. The device is able to react independently and to assume a "safe mode" of operation acceptable to its host, thereby allowing the system to boot. When in "safe mode" the device requires minimal resources from the system, allowing a review and modification of its settings such that it can operate in the system in which it is installed.

There is provided according to embodiments of the invention a method, which is carried out by initiating a startup sequence in a computer system including a host and a device connected to the host by a bus. The host has a driver for the device. The method is further carried out by detecting in the device a bus reset event from the host via the bus, and responsively to the bus reset event communicating a current configuration of the device to the host. The current configuration includes resources required to be allocated by the host. The method is further carried out upon failing to receive a startup command from the driver via the bus within a predetermined bus reset count. The predetermined bus reset count specifies a number of bus reset events that do not result in a successful initialization. Thereafter the method is further carried out in the device by autonomously modifying the current configuration to a safe mode configuration, wherein fewer resources are required to be allocated relative to the current configuration, and communicating the safe mode configuration via the bus from the device to the host.

One aspect of the method includes dispatching a notification of safe mode operation from the device to the driver and to an operating system in the host.

In a further aspect of the method the computer system is linked to a host manager server, and the method includes communicating from the host manager server a safe mode instruction to the computer system, wherein the safe mode instruction specifies the number of bus reset events prior to entry into a safe mode of operation.

According to still another aspect of the invention, modifying the current configuration is performed by a baseboard management controller in the host, the baseboard management controller being connected to the device via a side channel interface.

According to yet another aspect of the method, the bus is a PCIe bus.

There is further provided according to embodiments of the invention an I/O device, including a network interface linked to a data network, a host interface connectable to a host computer by a bus and receiving instructions from a driver in the host computer, and processing circuitry including a bus monitor linked to the host interface. The processing circuitry is configured for initiating a startup sequence responsively to a startup command from the driver, detecting with the bus monitor a bus reset event from the host computer via the bus, and responsively to the bus reset event communicating a current configuration to the host computer. The current configuration includes resources required to be allocated by the host computer. The processing circuitry is configured to recognize a failure to receive the startup command from the driver within a predetermined bus reset count, wherein the predetermined bus reset count specifies a number of bus reset events that do not result in a successful initialization. The processing circuitry is configured for thereafter autonomously modifying the current configuration to a safe mode configuration, wherein fewer resources are required to be allocated relative to the current configuration, communicating the safe mode configuration via the bus to the host computer, and exchanging data via the network interface in the safe mode configuration.

There is further provided according to embodiments of the invention a system, including a host computer having a driver, a network device having a network interface linked to a data network, a host interface connected to the host computer by a bus that receives instructions from the driver in the host computer. The system further includes processing circuitry including a bus monitor linked to the host interface. The processing circuitry is configured for initiating a startup sequence responsively to a startup command from the driver, detecting with the bus monitor a bus reset event from the host computer via the bus, and responsively to the bus reset event communicating a current configuration to the host computer. The current configuration includes resources required to be allocated by the host computer. The processing circuitry is configured to recognize a failure to receive the startup command from the driver within a predetermined bus reset count, wherein the predetermined bus reset count specifies a number of bus reset events that do not result in a successful initialization. The processing circuitry is configured for thereafter autonomously modifying the current configuration to a safe mode configuration, wherein fewer resources are required to be allocated relative to the current configuration, communicating the safe mode configuration via the bus to the host computer, and exchanging data via the network interface in the safe mode configuration.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Overview.

Although the exemplary embodiments described below relate, for purposes of clarity, specifically to a host channel adapter (HCA), the principles of the present invention are similarly applicable to other types of NICs with memory access capabilities, as well as to I/O devices of other sorts. Although the embodiments described herein may comprise a PCIe bus for communication with a host, in alternative embodiments, communication can be implemented using other suitable mechanisms, such as different bus technologies like PCI, USB and other bus technologies. An exemplary interface method over PCIe can use a command interface that can be implemented, for example, by writing the commands into the device through its PCI memory base address register (BAR). The BAR refers to a range in the memory map of the host processor, which is mapped for add-on card resources. When the host is writing to an address in this range the operation is automatically translated into write access to the add-on card. Alternatively, embodiments of the invention may use bus architectures other than the PCIe bus. Furthermore, the principles of the invention that are described herein may be applied, mutatis mutandis, to many types of hardware devices that are connected to the host bus and may access the host memory.

Figure 1:
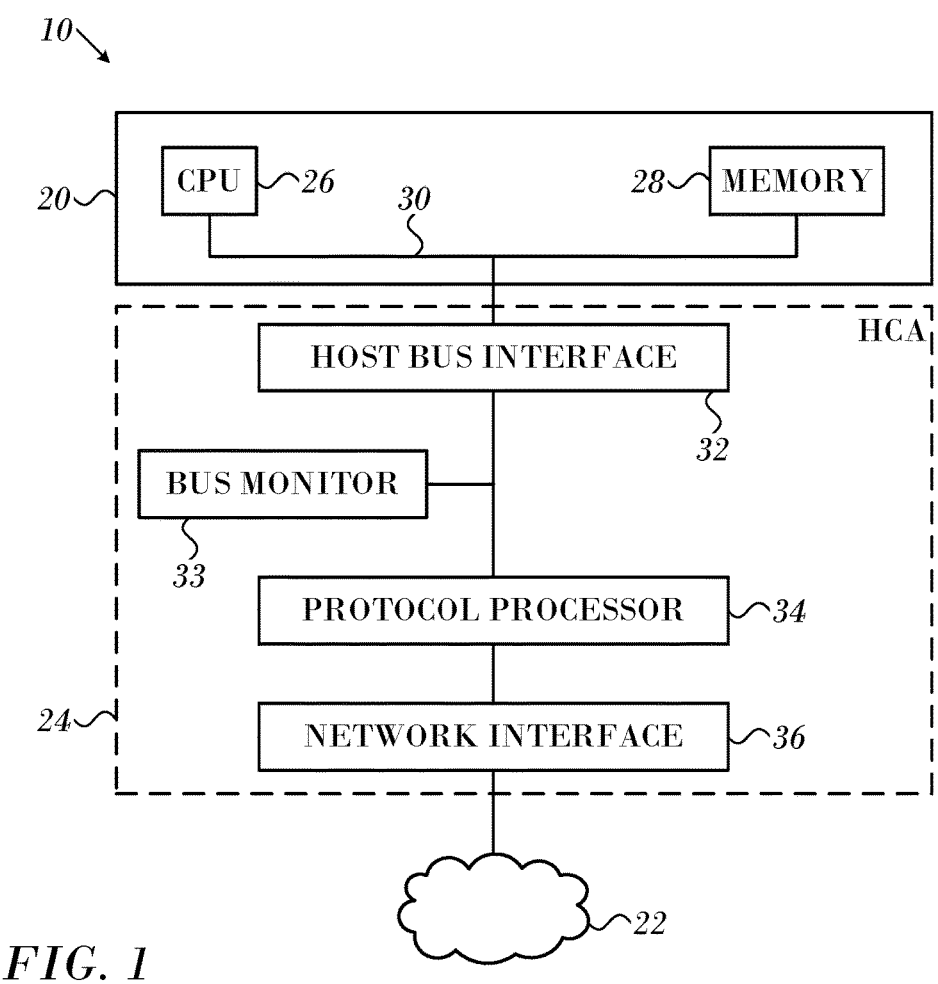
FIG. 1 is a block diagram that schematically illustrates a computer system in accordance with an embodiment of the invention.

Turning now to the drawings, Reference is initially made to FIG. 1, which is a block diagram that schematically illustrates a computer system 10 in accordance with an embodiment of the invention. Although portions of the system 10 shown in FIG. 1 and other drawing figures herein are shown as comprising a number of separate functional blocks, these blocks are not necessarily separate physical entities, but rather may represent, for example, different computing tasks or data objects stored in a memory that is accessible to the processor. These tasks may be carried out in software running on a single processor, or on multiple processors. The software may be provided to the processor or processors on tangible non-transitory media, such as CD-ROM or non-volatile memory. Alternatively or additionally, the system 10 may comprise a digital signal processor, field programmable gate array or hard-wired logic.

System 10 comprises a host 20 connected to an I/O (input/output) device, such as a host channel adapter 24, for communication with a packet network 22, such as an InfiniBand fabric or an Ethernet network. The computer comprises a host processor 26, which typically comprises a general-purpose central processing unit (CPU), and a system memory 28, connected to the host processor by a host bus 30, such as a PCIe bus, under the control of a suitable memory controller (not shown), as is known in the art. The host processor 26 typically runs an operating system and software applications. Memory 28 holds program instructions and application data, as well as metadata structures that are accessed and used by host channel adapter 24 in managing data transfer operations. In particular the memory 28 includes drivers for add-on devices such as the host channel adapter 24. The host processor 26, memory 28 and associated components are sometimes referred to herein as a "host."

Host channel adapter 24 is connected to bus 30 of the host computer by a host bus interface 32, comprising circuitry that enables the host channel adapter 24 to read and write data directly from and to memory 28 via the bus 30. The host bus interface 32 includes a bus monitor 33, which monitors bus traffic and detects certain events during startup and operation. The bus monitor 33 is typically implemented in firmware of the host channel adapter 24. Network interface circuitry 36 in host channel adapter 24 connects to network 22. Processing circuitry 34 in the host channel adapter 24 initialization and transport-layer processing functions in accordance with instructions received from host processor 26. These functions include constructing data packets containing data gathered from memory 28 for transmission over network 22, as well as receiving and processing incoming packets from network 22 and scattering the data contained in the packets to memory 28. The functions of the host channel adapter 24 are typically implemented in dedicated hardware circuits, such as those described in U.S. Patent Application Publication 2002/0152327, which is herein incorporated by reference.

Figure 2:
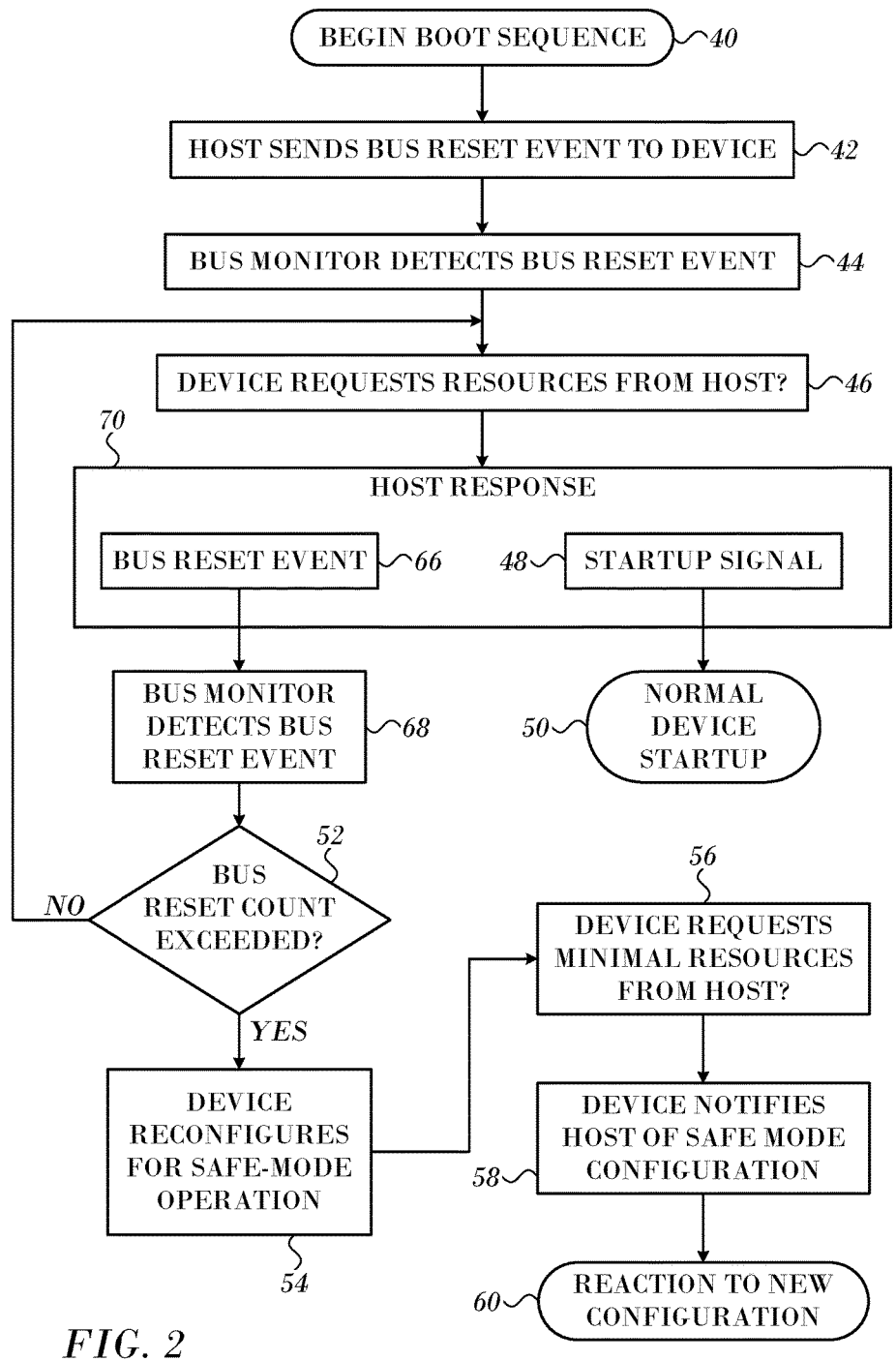
FIG. 2 is a flow chart that schematically shows a process of interaction between a host and an add-on device in accordance with an embodiment of the invention.

Reference is now made to FIG. 2, which is a flow chart that schematically shows a process of interaction between the host 20 and the host channel adapter 24, in accordance with an embodiment of the invention. The process steps are shown in a particular linear sequence in FIG. 2 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

As noted above, the host channel adapter 24 is specified for convenience. In general the principles of the invention apply to many add-on cards, local and remote devices that may be found in a computer system. At initial step 40 the boot sequence for the host 20 begins. Then, at step 42 at some point in the sequence, a message comprising a bus reset event is sent by the host 20 to the host channel adapter 24 to perform a bus reset operation. This can be, for example, a PCIe bus reset event.

The bus reset event is detected by the bus monitor 33 at step 44. When the reset operation ends, the host system will try to initialize host channel adapter 24. In order to operate, the host channel adapter 24 requires certain host resources to be allocated by the host 20. The allocation can be implemented by the host system BIOS or by the host operating system. These resources may include a region in the memory map specified by the base address register and dedicated to the host channel adapter 24. The maximum allowed memory range that could be allocated to the card is platform-dependent and operating system-dependent. For example, a memory range for a 32 bit operating system is 4 GBytes. For example, if the host channel adapter 24 requires an allocation of 1 GByte and the operating system doesn't have such a large memory range to allocate, then the host channel adapter 24 cannot be supported.

Another host resource that may be required for the host channel adapter 24 to operate is the number of interrupt interfaces available on the host 20 that are dedicated to the host channel adapter 24. Again, if the host channel adapter 24 requires more interrupt channels than are available on the host 20, then it cannot be supported.

At step 46 the host channel adapter 24 transmits its configuration including the resources that are required to be allocated by the operating system of the host 20. If the host 20 is able to support the requirements, it invokes the driver in memory 28 for the host channel adapter 24. Firmware in the host channel adapter 24 receives commands from the driver pursuant to the startup sequence of the host channel adapter 24. The firmware is programmed to expect a startup command following a system bus reset event and to act upon a failure to receive the commands. If the host 20 is unable to support the requirements of the host channel adapter 24 it does not invoke the driver, and a startup signal is not generated. Instead, another bus reset event is sent on the bus 30 to reattempt initialization of the host channel adapter 24.

In either case the host channel adapter 24 awaits a host response in step 70 Step 70 comprises either step 48, which is a startup command or step 66, which is another bus reset event.

When the startup command is received at step 48 it is concluded that the host channel adapter 24 is supported by the host 20. The device starts up normally and the procedure ends at final step 50.

When the bus reset event is received at step 66 it is detected by the bus monitor 33 at step 68.

Upon failure to receive the startup command the host channel adapter 24 is programmed to attempt a predetermined number of initialization cycles. At decision step 52, it is determined if the number of initialization cycles, which did not include startup signal has been exceeded, according to a bus reset count. If the determination at decision step 52 is negative, then control returns to step 46 and the host channel adapter 24 again attempts to secure support from the host 20.

Conventionally, if the determination at decision step 52 were affirmative, then usually one of two outcomes would occur, despite the fact that the host channel adapter 24 is fully functional:

(1) The host 20 may ignore the host channel adapter 24 because it cannot support it. In this case the host channel adapter 24 is not accessible to the operating system and is not enumerated, i.e., a logical address for the host channel adapter 24 is not assigned. There is no way to differentiate between this outcome and a hardware malfunction in the host channel adapter 24.

(2) The host 20 fails to complete its boot sequence. A warning message may be issued requesting the physical removal of the module. An exemplary message of this sort follows:

Option Card Configuration Error. An option card is requesting more memory mapped I/O than is available.

Action: Remove the option card to allow the system to boot.

Alternatively, no warning message is provided, and the host 20 simply remains hung in a non-operational state.

According to embodiments of the invention, when it is determined at decision step 52 that the maximum number of initialization cycles that were not followed by startup signal has been exceeded, then at step 54 the host channel adapter 24 autonomously reconfigures itself for safe mode operation according to a profile known to its circuitry 34. In the reconfigured state fewer resources are required from the host 20 to be assigned for the host channel adapter 24 relative to its earlier configuration. For example, the host channel adapter 24 may require a small BAR size in the host 20, operate with fewer interrupts or even no interrupts at all.

Then at step 56 the host channel adapter 24 transmits its new configuration requesting allocation of minimal resources by the host 20, and awaits a startup signal, after which the host channel adapter 24 operates in safe mode.

At step 58 an indication of safe mode operation is provided by the host channel adapter 24 to the relevant components of the host 20—the operating system, software driver and supporting software applications. If present, notification is also provided to a baseboard management controller (BMC). Typically, the driver indicates operation in safe mode through a log in the operating system ("dmesg" log), as well as through a status bit that is accessible to the applications and the operating system. A message on the display informs the operator as well.

At final step 60 the operator reacts to the indication provided in step 58 by setting new configuration settings matching available resources of the host 20, or adjusting the system to accommodate greater requirements of the host channel adapter 24, or both.

First Alternate Embodiment

Figure 3:
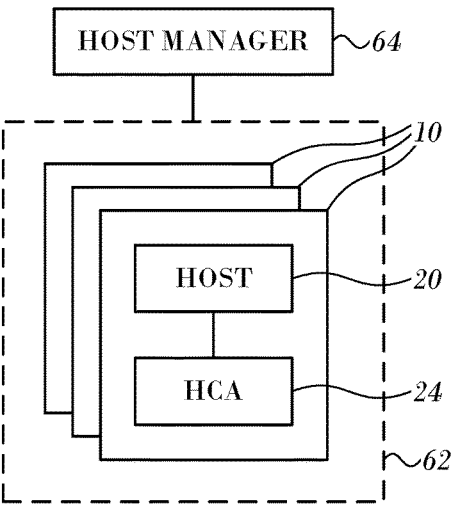
FIG. 3 is a block diagram of an arrangement of host servers and add-on devices that can be operated in a hardware safe mode in accordance with an alternate embodiment of the invention.

Reference is now made to FIG. 3, which is a block diagram of an arrangement for configuring operation in hardware safe mode in accordance with an alternate embodiment of the invention. In this embodiment there are a plurality of instances of the system 10, which are members of a cluster 62, all connected to a server acting as a host manager 64 for the cluster 62.

The host manager 64, inter alia, configures settings of the hardware safe mode of the [0044] members, collectively, or individually according to some governing policy by commands sent to members of the cluster 62 from the host manager 64 over a sideband channel, according to the teachings of commonly assigned U.S. Patent Application Publication No. 2015/0215343, entitled Multi-Host Network Interface Controller with Host Management, which is herein incorporated by reference.

A host-management command enables configuration of the different settings according to the following modes:
0—Safe Mode is disabled.
1—Safe Mode is enabled after a number of bad reboots (Num_Bad_Reboots).
2—Safe mode is activated once in the next reboot.
3—Safe mode is enforced for any boot.

The sideband channel may comprise any suitable buses, interfaces, and protocols. For example, in some embodiments the sideband channel comprises the Management Component Transport Protocol (MCTP) and Network Controller Sideband interface (NC-SI), over the System Management Bus (SMBus). Alternatively, the sideband channel comprises a Reduced Media independent interface (RMII) Based Transport (RBT) protocol over an RMII interface. Alternatively, the sideband or management channel may comprise the NC-SI using the Management Component Transport Protocol (MCTP) over the Peripheral Component interconnect Express Bus (PCIe).

Second Alternate Embodiment

Figure 4:
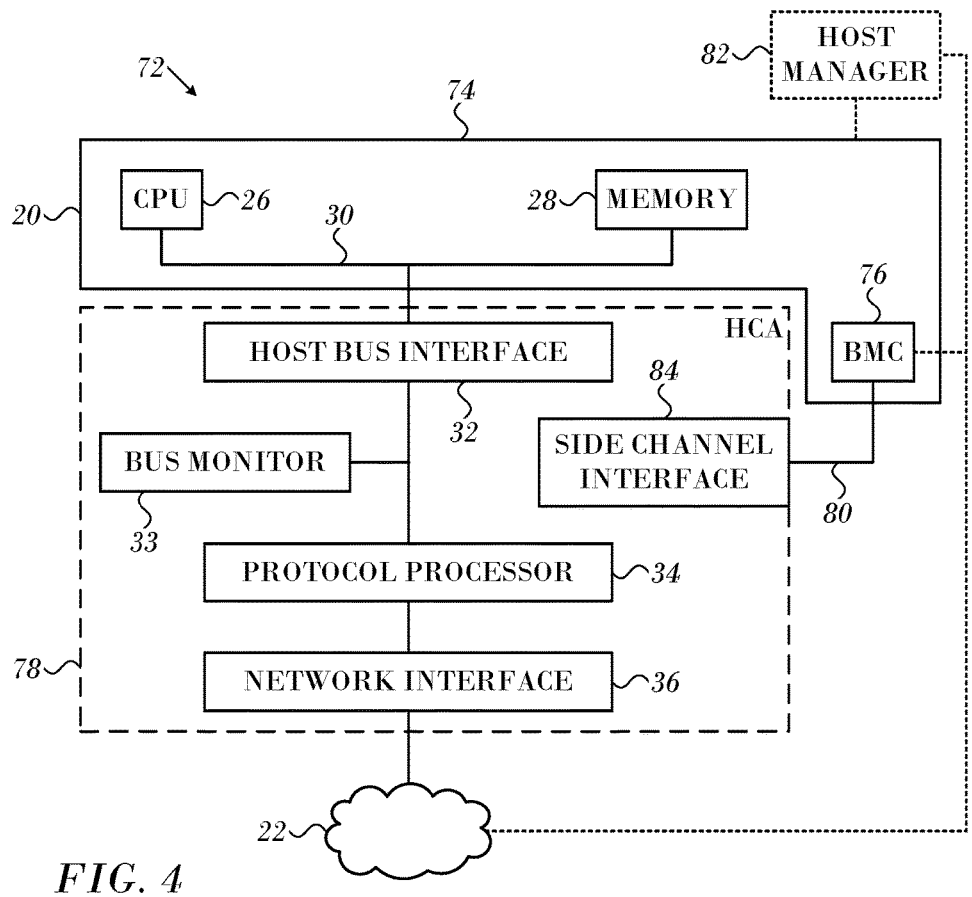
FIG. 4 is a block diagram that schematically illustrates a computer system in accordance with an embodiment of the invention.

Reference is now made to FIG. 4, which is a block diagram that schematically illustrates a computer system 72 in accordance with an embodiment of the invention. The arrangement is similar to the system 10 (FIG. 1), except now a host 74 is provided with a baseboard management controller 76 that communicates with host channel adapter 78 via a side channel 80 via a side channel interface 84.

The baseboard management controller 76 is configured to perform the device reconfiguration of step 54 (FIG. 2) described above. Moreover, in embodiments when the host 74 is under control of a host manager 82, the baseboard management controller 76 may communicate directly with the host manager 82 to accept the safe mode settings described in the previous embodiment.

The host manager 82 may control host 74 either by a dedicated management interface connection to the baseboard management controller 76 or may control the baseboard management controller 76 through network traffic using the side channel interface 84 using NC-SI, or by directly controlling the configurations of host 74 through a dedicated interface or through a network connection through host channel adapter 78 to host 74.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
   initiating a startup sequence in a computer system comprising a host and a device connected to the host by a bus, the host having a driver for the device;
   detecting in the device a bus reset event from the host via the bus;
   responsively to the bus reset event communicating a current configuration of the device to the host, the current configuration comprising resources required to be allocated by the host;
   failing to receive via the bus a startup command from the driver within a predetermined bus reset count, wherein the predetermined bus reset count specifies a number of bus reset events that do not result in a successful initialization;
   thereafter in the device autonomously modifying the current configuration to a safe mode configuration, wherein fewer resources are required to be allocated relative to the current configuration; and
   communicating the safe mode configuration via the bus from the device to the host.

2. The method according to claim 1, further comprising dispatching a notification of safe mode operation from the device to the driver and to an operating system in the host.

3. The method according to claim 1, wherein the computer system is linked to a host manager server, further comprising the steps of:
   communicating from the host manager server a safe mode instruction to the computer system, wherein the safe mode instruction specifies the number of bus reset events prior to entry into a safe mode of operation.

4. The method according to claim 1, wherein modifying the current configuration is performed by a baseboard management controller in the host, the baseboard management controller being connected to the device via a side channel interface.

5. The method according to claim 1, wherein the bus is a PCIe bus.

6. An I/O device, comprising:
   a network interface linked to a data network;
   a host interface connectable to a host computer by a bus and receiving instructions from a driver in the host computer;
   processing circuitry comprising a bus monitor linked to the host interface, the processing circuitry configured for:

initiating a startup sequence responsively to a startup command from the driver;

detecting with the bus monitor a bus reset event from the host computer via the bus;

responsively to the bus reset event communicating a current configuration to the host computer, the current configuration comprising resources required to be allocated by the host computer;

failing to receive the startup command from the driver within a predetermined bus reset count, wherein the predetermined bus reset count specifies a number of bus reset events that do not result in a successful initialization;

thereafter autonomously modifying the current configuration to a safe mode configuration, wherein fewer resources are required to be allocated relative to the current configuration;

communicating the safe mode configuration via the bus to the host computer; and exchanging data via the network interface in the safe mode configuration.

7. The device according to claim 6, wherein the processing circuitry is configured for dispatching a notification of safe mode operation to the host computer.

8. The device according to claim 6, wherein the host computer is linked to a host manager server, wherein the processing circuitry is configured for receiving a safe mode instruction that originates from the host manager server, the safe mode instruction specifying the number of bus reset events prior to entry into a safe mode of operation.

9. The device according to claim 6, further comprising a side channel interface wherein the processing circuitry is configured for accepting a modification of the current configuration from a baseboard management controller in the host computer, the baseboard management controller being connected to the side channel interface.

10. The device according to claim 6, wherein the bus is a PCIe bus.

11. A system, comprising:
a host computer having a driver;
a network device having a network interface linked to a data network, a host interface connected to the host computer by a bus and receiving instructions from the driver in the host computer and processing circuitry comprising a bus monitor linked to the host interface, the processing circuitry configured for:

initiating a startup sequence responsively to a startup command from the driver;

detecting with the bus monitor a bus reset event from the host computer via the bus;

responsively to the bus reset event communicating a current configuration to the host computer, the current configuration comprising resources required to be allocated by the host computer;

failing to receive the startup command from the driver within a predetermined bus reset count, wherein the predetermined bus reset count specifies a number of bus reset events that do not result in a successful initialization;

thereafter autonomously modifying the current configuration to a safe mode configuration, wherein fewer resources are required to be allocated relative to the current configuration;

communicating the safe mode configuration via the bus to the host computer; and exchanging data via the network interface in the safe mode configuration.

12. The system according to claim 11, wherein the processing circuitry is configured for dispatching a notification of safe mode operation to the host computer.

13. The system according to claim 11, wherein the host computer is linked to a host manager server, wherein the processing circuitry is configured for receiving a safe mode instruction that originates from the host manager server, the safe mode instruction specifying the number of bus reset events prior to entry into a safe mode of operation.

14. The system according to claim 11, wherein the network device further comprises a side channel interface and the processing circuitry is configured for accepting a modification of the current configuration from a baseboard management controller in the host computer, the baseboard management controller being connected to the side channel interface.

15. The system according to claim 11, wherein the bus is a PCIe bus.

* * * * *